United States Patent [19]

Watts, Jr. et al.

[11] 4,181,682
[45] Jan. 1, 1980

[54] AMINATED PROPOXYLATED POLYBUTANEDIOLS

[75] Inventors: Lewis W. Watts, Jr.; Harold G. Waddill, both of Austin, Tex.

[73] Assignee: Texaco Development Corp., White Plains, N.Y.

[21] Appl. No.: 868,149

[22] Filed: Jan. 9, 1978

[51] Int. Cl.$^2$ .................. C07C 93/04; C07C 89/00
[52] U.S. Cl. ........................ 260/584 B; 260/585 B
[58] Field of Search ............................ 260/585 B

[56] References Cited

U.S. PATENT DOCUMENTS

| | | | |
|---|---|---|---|
| 3,016,404 | 1/1962 | Beauchamp et al. | 260/584 B X |
| 3,117,998 | 1/1964 | Cosby et al. | 260/584 B |
| 3,316,185 | 4/1967 | Reinking | 260/584 B X |
| 3,440,029 | 4/1969 | Little et al. | 260/584 B X |
| 3,445,525 | 5/1969 | Bormann et al. | 260/584 B X |
| 3,496,138 | 2/1970 | Sellers et al. | 260/584 B X |
| 3,531,527 | 9/1970 | Li et al. | 260/584 B X |
| 3,658,902 | 4/1972 | Bordenca | 260/584 B X |
| 4,036,883 | 7/1977 | Voges et al. | 260/585 B |

FOREIGN PATENT DOCUMENTS 1219024   1/1971   United Kingdom ............... 260/584 B

OTHER PUBLICATIONS

Farbwerke, Belgian Patent No. 677,124, Derwent Belgian Patents Report, No. 35/66, p. 1:4 (1966).

*Primary Examiner*—Winston A. Douglas
*Assistant Examiner*—John Doll
*Attorney, Agent, or Firm*—Carl G. Ries; Thomas H. Whaley; James L. Bailey

[57] ABSTRACT

Covers a polymeric amine having the following structural formula:

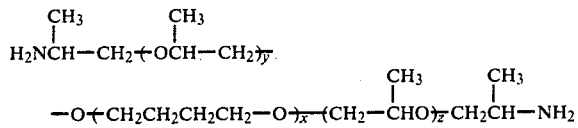

where x is an average number ranging from about 6 to 50, and y and z are average numbers ranging from about 1 to about 20, with the sum of y and z being from about 6 to about 40. Also covers a method of preparing said amine polymer.

4 Claims, No Drawings

AMINATED PROPOXYLATED POLYBUTANEDIOLS

BACKGROUND OF THE INVENTION

1. Field of the Invention

This invention is concerned with amine polymers useful as epoxy curing agents and the like. The present invention is also concerned with a process for preparing said amine polymers.

2. Description of the Prior Art

The art is replete with various classes of polymeric amines and their method of preparation. Representative is U.S. Pat. No. 3,370,077. However, their utility in many instances is dependent upon their having the exact molecular configuration and properties necessary to properly achieve the desired utility or utilities. For example, in some instances proper chain linearity is necessary. In many cases the degree of linearity governs the extent of product stability under various environmental conditions. In yet other cases it is necessary that the proper HLB ratio be present. That is, the molecule should have the desired hydrophilic-hydrophobic balance. Again, such proper HLB ratio is necessary for proper solubility or miscibility in certain solvents or media in which activity is shown. The exact molecular configuration, including kinds of hydrophilic functional groups, extent of polymerization, type of backbone, etc. factors will largely determine such properties as stability, including oxidative stability.

It therefore becomes an object of the invention to provide a new class of polymeric amines carefully tailored from a chemical standpoint to possess sought-after properties for diverse end-utilities.

Another object of the invention is to provide a simplified technique for producing said above class of polyamine compositions.

Other objects will appear hereinafter.

SUMMARY OF THE INVENTION

In its broadest aspects the present invention provides a novel class of polymeric amines having the following structural formula:

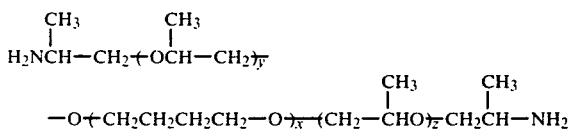

where x is an average number ranging from about 6 to 50, and y and y are average numbers ranging from about 1 to about 20, with the sum of y and z being from about 6 to about 40.

DETAILED DESCRIPTION OF THE INVENTION

The present invention is also concerned with a simple yet unique way of achieving the above polymeric amines.

The first step in the invention involves providing as a starting reactant a polybutanediol having the following structural formula:

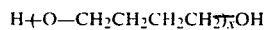

where x is an average number ranging from about 6 to about 50, and propoxylating said polybutanediol with sufficient propylene oxide to provide an adduct having the structure:

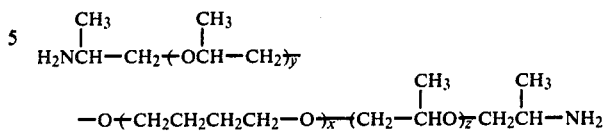

where y and z are average numbers ranging from about 1 to about 20 with the sum of y and z being from about 6 to about 40. Moreoften the sum of y and z is 6–20 and most preferably is 6–10. X is an average number ranging from about 6 to about 50 and more often ranges from about 8 to about 40.

Starting diols of the above type which can be propoxylated are commercially available, and need little elaboration. For example, a typical useful starting material of this class is a polyoxybutylene diol sold under the trademark POLYMEG ® 1000 by QUAKER Oats Co. This particular material has an average molecular weight of approximately 1000.

The propoyxlation reaction can be conducted using conventional methods and conditions such as temperatures in the range of about 40° to about 200° C and pressures from about 0 to about 100 psig. Usually the reaction occurs under basic conditions established through the use of alkali metals, their hydroxides, oxides and hydrides and in some cases basic amines. Representative alkoxylation procedures which may be followed here are described in the following reference: Martin J. Schick, Ed. "Nonionic Surfactants", Marcel Dekker Inc., New York, N.Y. 1967, pp. 187–204. It is necessary, of course, that sufficient propoxylene oxide be added to the polybutanediol to provide a propoxylated product wherein the sum of y and z is at least six.

It is interesting to note that one cannot directly aminate the polybutanediol by means of conventional reductive amination catalysts such as a nickel-based catalyst. It was discovered here that when such direct reductive amination is carried out hydrogenolysis occurred. Thus, in order to avoid such hydrogenolysis it was found that the primary alcohol must be transformed into a secondary alcohol by means of the propylene oxide reaction to make the resultant diol amenable to reductive amination.

The propylene oxide adduct is then reacted with ammonia or ammonia hydroxide in presence of a suitable reductive amination catalyst to produce the desired polymeric amine. A wide number of known catalysts of this type are useful here. Preferred are nickel and cobalt-based catalysts with the most preferred being a nickel-based catalyst, including Raney nickel and nickel in combination with other metals or oxides of metals.

The above-described propylene oxide adducts are reacted with ammonia or ammonium hydroxide (preferably ammonia) in the presence of said hydrogenation-dehydrogenation catalyst at elevated temperatures in the presence of hydrogen to form the amines of the invention. Suitable reactors include either a closed autoclave resulting in a batch process or a tubular reactor which can be operated in a continuous manner. Either is suitable for the practice of this invention.

As just noted the class of useful catalysts here is well known and may include one or more metals including copper, nickel, cobalt, chromium, aluminum, maganese, platinum, palladium and rhodium and the oxides of these metals. The metals or their oxides may be employed in combination with normally nonreducible metal oxides such as chromium oxide, molybdenum oxide and manganese oxide. The amount of the nonreducible oxide employed may be varied considerably and some catalysts, notably those based upon cobalt require the presence of no nonreducible metal oxides.

One preferred catalyst that is very effective for the amination reaction, includes the metals or oxides of nickel, cobalt and chromium. A particularly satisfactory catalyst is one in which the active ingredients consist essentially, in mole percentages on an oxide-free basis of 60–85 percent nickel, 14–37 percent copper and 1–5 percent chromium, as produced in accordance with procedures described in U.S. Pat. No. 3,152,998. As used herein this catalyst will be referred to as a nickel-copper-chromium catalyst.

The reductive amination reaction is carried out from 160° to 250° C. The reaction pressures are from 750 to about 4000 psig with a hydrogen partial pressure of at least 200 psig. The preferred pressure range is from about 1000 to about 2500 psig and a hydrogen partial pressure from about 200 to about 2000 psig.

The residence time in the reactor to be used to produce the amine polymers of the invention are those which would occur at space velocities of about 0.2 to about 3.2 volume of reactants per volume of catalyst per hour, with the preferred space velocity being from about 1.0 to about 2.0. The space velocity herein described is in cm$^3$/volume of catalyst (1000 cm$^3$)/hour, but rates in equivalent units are equally applicable.

The ratio of reactants, i.e., propylene oxide adduct and the ammonia can vary over a wide range to produce the amine polymers of the invention. The feed rate of the adduct expressed here in terms of per hour, can vary from about one times the ammonia feed rate to from about 0.2 times the ammonia feed rate.

By the following the above-discussed techniques of the invention substantially all of the hydroxyl groups of the propylene oxide adduct are transformed into primary amine groups.

The amines here are structured such that they have particularly desirable properties. For example, due to the linearity of the chain, increased stability, and particularly increased oxidative stability are noted. In addition, the HLB ratio of such materials is materially different from many of those available on the market. For example, amines derived from polyethylene glycol are not as miscible in oils as are the present amine polymers. The enhanced hydrophobic character of these polymeric amines here is a particularly desirable property for a wide variety of utilities.

The polyamines are useful for a wide scope of utilities. Typically, they may be used as epoxy curing agents and as precursors to isocyanates which are useful as polyurethane foams components.

The above-described invention is more particularly set forth in the following Examples which are to be construed for purposes of illustration only and not for limitation of the invention. Obvious modifications of the following Examples can be made.

EXAMPLE I

A polyoxybutylene diol (Polymeg 1000, available from Quaker Oats Co.) of a molecular weight of approximately 1000 was provided in an amount of 30.0 lbs. To this was added 50.0 grams potassium hydroxide, and the mixture placed in a 10 gal. stirred reactor. Propylene oxide in an amount of 22.0 lbs., was slowly added over a period of three hours to a hot (130° C.) mixture of basic diol. After digesting the resultant reaction mixture at 130° C. for two hours the product was allowed to cool. The product was then neutralized with citric acid (120 grams), and after stripping under reduced pressure, and filtering, there was isolated an essentially colorless mobile liquid having a hydroxyl number of 108 mg KOH/g sample. The product was a 6.7 mole propylene oxide adduct, that is, y plus z equaled 6.7.

EXAMPLE II

To a 500 ml high pressure reactor system there was charged 500 grams of a prereduced, pelleted nickel-copper-chromium catalyst containing 75 mole per cent nickel, 23 percent copper and 2 mole percent chromium. The propylene oxide adduct of Example I was introduced at the rate of 0.393 lbs./hr. along with anhydrous ammonia at 0.81 lbs./hr., and hydrogen at 76 lbs./hr. The reaction temperature was 206°–214° C., the reaction pressure was 2550 psig, and the liquid hourly space velocity was 1.09.

After stripping the resulting crude product to 100° C. at 0.2 mm Hg there was isolated an essentially colorless liquid. The total acetylatables of this liquid was 1.95 meg/gm (theory, 1.98). The total amines was 1.72 meg/gm (theory, 1.98), and the primary amines was 1.69 meg/gm (theory, 1.98). The persent of primary amines was 98.3% demonstrating the unexpected substantially complete conversion of the terminal hydroxyl groups to primary amine terminal groups.

EXAMPLE III

The polymeric amine of Example II was then used to cure an epoxy resin. To 100 parts of resin was added 153 parts of the polyamine. A cured ⅛ inch casting had a tensile strength of 130 psi and an elongation at break of 25 percent. The Shore A hardness, 0–10 sec. was 59–59. The casting had been cured for two hours at 80° C. followed by a three hour cure at 125° C.

In order to provide an amine compound of proper HLB ratio for a number of end-uses it has been found necessary that the sum of $y+z$ in the formula above be at least six. For example, isocyanate derivatives of amines falling without this limit, say where $y+z$ is three, are of surprisingly inferior overall quality, making them somewhat undesirable as urethane foam components.

We claim:

1. A polymer composition comprising a polymeric amine having the following structural formula:

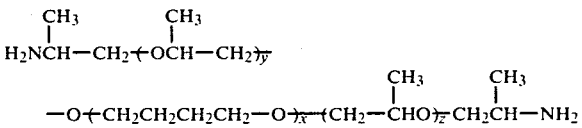

where x is an average number ranging from about 6 to 50, and y and z are average numbers ranging from about 1 to about 20 with the sum of y and z being from about 6 to about 40.

2. The composition of claim 1 where the sum of y and z is 6–20.

3. The composition of claim 2 where the sum of y and z is 6–10.

4. The composition of claim 1 where x equals 8–40.

* * * * *